USO07685077B2

(12) United States Patent
Li et al.

(10) Patent No.: US 7,685,077 B2
(45) Date of Patent: Mar. 23, 2010

(54) RECURSIVE FEATURE ELIMINATING METHOD BASED ON A SUPPORT VECTOR MACHINE

(75) Inventors: Eric Q. Li, Beijing (CN); Qian Diao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 613 days.

(21) Appl. No.: 10/587,094

(22) PCT Filed: Aug. 11, 2005

(86) PCT No.: PCT/CN2005/001242

§ 371 (c)(1),
(2), (4) Date: Jul. 20, 2006

(87) PCT Pub. No.: WO2007/016814

PCT Pub. Date: Feb. 15, 2007

(65) Prior Publication Data

US 2008/0243728 A1    Oct. 2, 2008

(51) Int. Cl.
*G06F 15/18*   (2006.01)
(52) U.S. Cl. ..................................................... 706/12
(58) Field of Classification Search .................. None
See application file for complete search history.

(56) References Cited

U.S. PATENT DOCUMENTS

2003/0172043 A1   9/2003   Guyon

FOREIGN PATENT DOCUMENTS

WO   WO2004105573 A   12/2004

OTHER PUBLICATIONS

'An introduction to support vector machines and other kernel based learning methods': Cristianini, 2000, Cambridge University Press, p. 18, 29, 30, 45, 125.*
'Gene selection for cancer classification using support vector machines': Guyon, 2002, Machine Learning, vol. 46, pp. 389-422 (1-39).*
International Search Report and Written Opinion, International Application No. PCT/CN2005/001242, mailing date Jun. 15, 2006.
International Preliminary Report on Patentability, International Application No. PCT/CN2005/001242, mailing date Jun. 15, 2006, 4.
Written Opinion of the International Searching Authority, International Application No. PCT/CN2005/001242, mailing date Jun. 15, 2006, 3.

(Continued)

*Primary Examiner*—David R Vincent
*Assistant Examiner*—Peter Coughlan
(74) *Attorney, Agent, or Firm*—Blakely, Sokoloff, Taylor & Zafman LLP

(57) ABSTRACT

Method, apparatus and system are described to perform a feature eliminating method based on a support vector machine. In some embodiments, a value for each feature in a group of features provided by a training data is determined. At least one feature is eliminated from the group by utilizing the value for each feature in the group. The value for each feature in the group is updated based upon a part of the training data that corresponds to the eliminated feature.

15 Claims, 4 Drawing Sheets

OTHER PUBLICATIONS

Petricoin et al: Use of Proteomic Patterns in Serum to Identify Ovarian Cancer, The Lancet, vol. 359, Feb. 16, 2002, Mechanisms of Disease, pp. 572-577 www.thelancet.com.

Ambroise et al: Selection Bias in gene Extraction on the Basis of Microarray Gene-Expression Data, Proceedings of the National Academy of Sciences, vol. 99, No. 10, May 14, 2002, 5 pages www.pnas.org/cgi/doi/10.1073/pnas.102102699.

Boser et al: A Training Algorithm for Optimal Margin classifiers, AT &T Bell Labs / Univ. of California, Berkeley, 9 pages.

Guyon et al: Gene Selection for Cancer Classification Using Support Vector Machines, Barnhill Bioinformatics, Savannah, GA AT & T Labs, Red Bank, NJ, USA pp. 1-39.

Platt: Fast Training of Support Vector Machines Using Sequential minimal Optimization, Microsoft REsearch, Redmond, WA www.research.microsoft.com/~jplatt.

Golub et al: Molecular Classification of Cancer: Class Discovery and Class Prediction by Gene Expression Monitoring, Science, vol. 286, Oct. 15, 1999, www.sciencemag.org.

An Introduction to Support Vector Machines and Other Kernel-based Learning Methods 4 pages.

Joachims: Making Large-Scale SVM Learning Practical, chapter 11, 16 pages To be pub'd in: Advances in Kernel Methods—Support Vector Learning, MIT Press, (Cambridge, USA, 1998.

Chih-Chung Chang, et al: LIBSVM: A Library for Support Vector Machines, De't of Computer Science and Information Engineering, Nat'l Taiwan Univ, Taipei, Taiwan, Last updated: Mar. 28, 2004.

Osuna, et al: Training Support Vector Machines: an Application to Face Detection, To appear in the Proceedings of CVPR '97, Jun. 17-19, 1997, Puerto Rico Center for biological and Computational Learning and Operations Research Center, MIT, Cambridge, MA, USA, 8 pages.

* cited by examiner

RECURSIVE FEATURE ELIMINATING METHOD BASED ON A SUPPORT VECTOR MACHINE

This U.S. application claims priority to Pending International Application Number PCT/CN2005-001242, filed PCT China on Aug. 11, 2005.

BACKGROUND

A recursive feature eliminating method based on a support vector machine (SVM-RFE) is widely used in data intensive applications, such as disease genes selection, structured data mining, and unstructured data mining, etc. The SVM-RFE method may comprise: SVM training an input training data to classify the training data, wherein the training data may comprise a plurality of training samples corresponding to a group of features and class labels associated with each of the training samples; eliminating at least one feature with a minimum ranking criterion from the group of features; and repeating the aforementioned SVM training and eliminating until the group becomes empty. The SVM-RFE may be used to rank the features, for example, to rank the genes that may cause a disease. Rounds of SVM training and eliminating are independent with each other.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for a recursive feature eliminating method based on a support vector machine. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices and other possible mediums.

Figure 1:
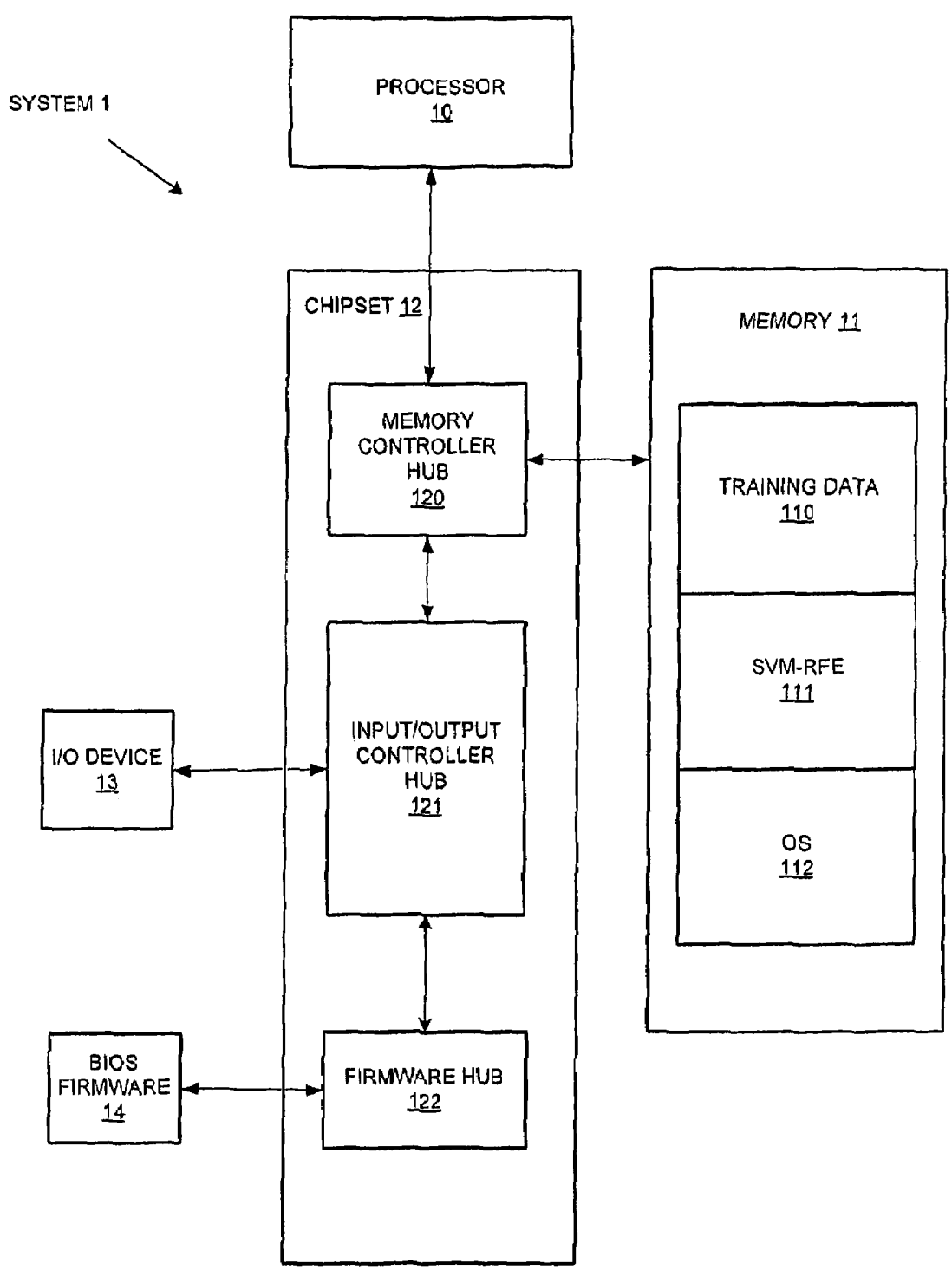
FIG. 1 illustrates an embodiment of a computing system applying a SVM-RFE method.

FIG. 1 shows a computing system for implementing a recursive feature eliminating method based on a support vector machine (SVM-RFE). A non-exhausive list of examples for the computing system may include distributed computing systems, supercomputers, computing clusters, mainframe computers, mini-computers, client-server systems, personal computers, workstations, servers, portable computers, laptop computers and other devices for transceiving and processing data.

In an embodiment, the computing system 1 may comprise one or more processors 10, memory 11, chipset 12, I/O device 13, BIOS firmware 14 and the like. The one or more processors 10 are communicatively coupled to various components (e.g., the memory 11) via one or more buses such as a processor bus as depicted in FIG. 1. The processors 10 may be implemented as an integrated circuit (IC) with one or more processing cores that may execute codes under a suitable architecture, for example, including Intel® Xeon™ MP architecture available from Intel Corporation of Santa Clara, Calif.

In an embodiment, the memory 12 may store codes to be executed by the processor 10. In an embodiment, the memory 12 may store training data 110, SVM-RFE 111 and operation system (OS) 112. A non-exhausive list of examples for the memory 102 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), flash memory devices, and the like.

In an embodiment, the chipset 12 may provide one or more communicative path among the processor 10, memory 11 and various components, such as the I/O device 13 and BIOS firmware 14. The chipset 12 may comprise a memory controller hub 120, an input/output controller hub 121 and a firmware hub 122.

In an embodiment, the memory controller hub 120 may provide a communication link to the processor bus that may connect with the processor 101 and to a suitable device such as the memory 11. The memory controller hub 120 may couple with the I/O controller hub 121, that may provide an interface to the I/O devices 13 or peripheral components (not shown in FIG. 1) for the computing system 1 such as a keyboard and a mouse. A non-exhausive list of examples for the I/O devices 13 may comprise a network card, a storage device, a camera, a blue-tooth, an antenna, and the like. The I/O controller hub 121 may further provide communication link to a graphic controller and an audio controller (not shown in FIG. 1). The graphic controller may control the display of information on a display device and the audio controller may control the display of information on an audio device.

In an embodiment, the memory controller hub 120 may communicatively couple with a firmware hub 122 via the input/output controller hub 121. The firmware hub 122 may couple with the BIOS firmware 14 that may store routines that the computing device 100 executes during system startup in order to initialize the processors 10, chipset 12, and other components of the computing device 1. Moreover, the BIOS firmware 14 may comprise routines or drivers that the computing device 1 may execute to communicate with one or more components of the computing device 1.

In an embodiment, the training data 110 may be input from a suitable devices, such as the I/O component 13, or the BIOS firmware. Examples for the training data 110 may comprise data collected for a feature selection/ranking task, such as gene expression data from a plurality of human beings or other species, or text data from web or other sources. The data format may be structured data, such as a database or table, or unstructured data, such as matrix or vector. The SVM-RFE 111 may be implemented between the training data 110 and the operation system 112. In an embodiment, the operation system 112 may include, but not limited to, different versions of LINUX, Microsoft Windows™ Server 2003, and real time operating systems such as VxWorkS™, etc. In an embodiment, the SVM-RFE 111 may implement operations of: SVM training the training data 110 that corresponds to a group of features; eliminating at least one feature from the group according to a predetermined ranking criterion; and repeating the SVM training and feature eliminating until the number of features in the group reaches a predetermined value, for example, until the group becomes empty, wherein the rounds of SVM training and eliminating dependent with each other. The SVM-RFE 111 may output a feature elimination history or a feature ranking list.

Figure 2:
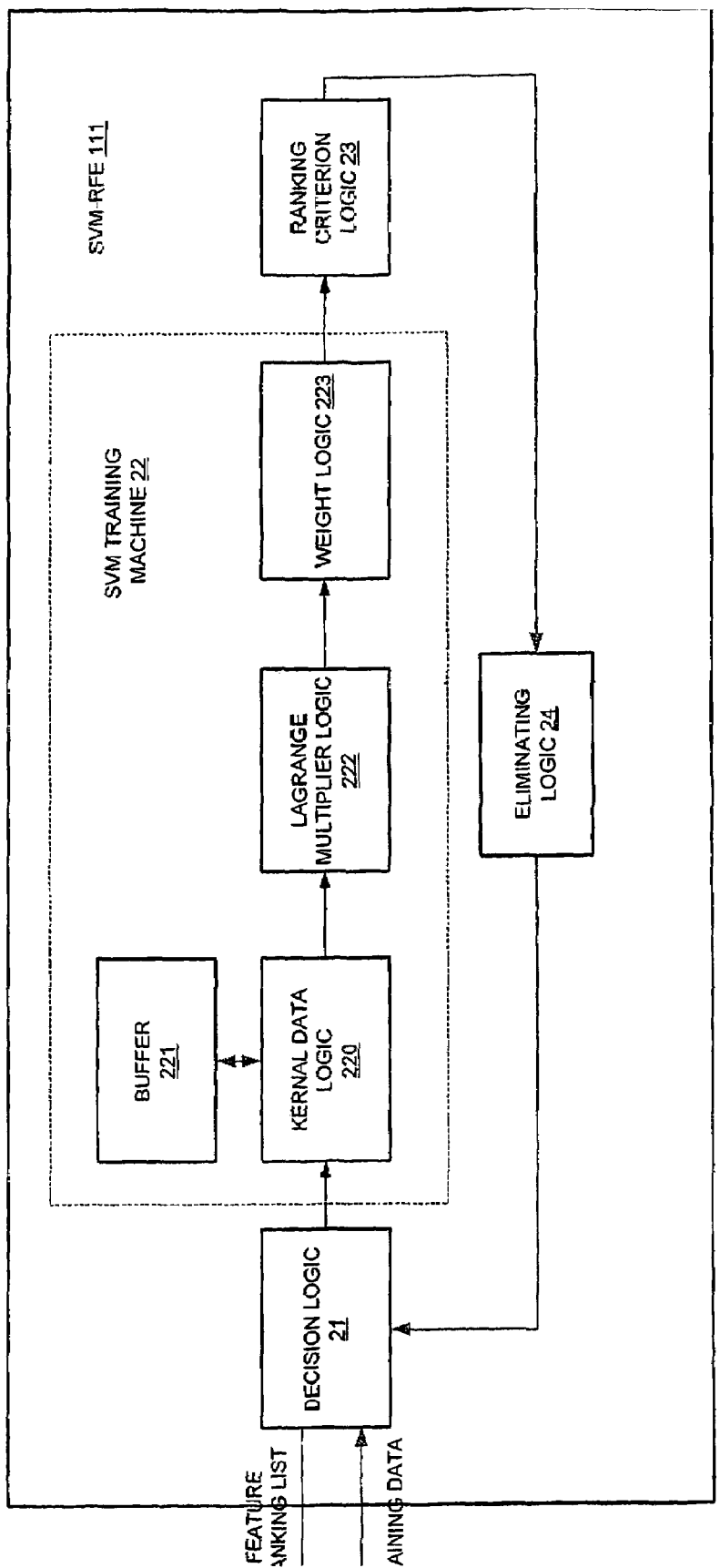
FIG. 2 illustrates an embodiment of a SVM-RFE machine in the computing system of FIG. 1.

Other embodiments may implement other modifications or variations to the structure of the aforementioned computing system 1. For example, the SVM-RFE 111 may be implemented as an integrated circuit with various functional logics as depicted in FIG. 2. For another example, the memory 11 may further comprise a validation software (not show in FIG. 1) to validate the SVM-RFE classification by the SVM-RFE 111. More specifically, the validation software may determine whether a person has a disease by checking his/her gene expression with a gene ranking list output by the SVM-RFE 111.

An embodiment of the SVM-RFE 111 is shown in FIG. 2. As shown, the SVM-RFE 111 may comprise a decision logic 21, a SVM learning machine 22, a ranking criterion logic 23 and an eliminating logic 24.

In an embodiment, the training data 110 input to the SVM-RFE 111 may comprise a plurality of training samples $[x_1, x_2, \ldots, x_m]$ corresponding to a group of embodiment, the operation system 112 may include, but not limited to, different versions of LINUX, Microsoft Windows™ Server 2003, and real time operating systems such as VxWorkS™, etc. In an embodiment, the SVM-RFE 111 may implement operations of: SVM training the training data 110 that corresponds to a group of features; eliminating at least one feature from the group according to a predetermined ranking criterion; and repeating the SVM training and feature eliminating until the number of features in the group reaches a predetermined value, for example, until the group becomes empty, wherein the rounds of SVM training and eliminating dependent with each other. The SVM-RFE 111 may output a feature elimination history or a feature ranking list.

Other embodiments may implement other modifications or variations to the structure of the aforementioned computing system 1. For example, the SVM-RFE 111 may be implemented as an integrated circuit with various functional logics as depicted in FIG. 2. For another example, the memory 11 may further comprise a validation software (not show in FIG. 1) to validate the SVM-RFE classification by the SVM-RFE 111. More specifically, the validation software may determine whether a person has a disease by checking his/her gene expression with a gene ranking list output by the SVM-RFE 111.

An embodiment of the SVM-RFE 111 is shown in FIG. 2. As shown, the SVM-RFE 111 may comprise a decision logic 21, a SVM learning machine 22, a ranking criterion logic 23 and an eliminating logic 24.

In an embodiment, the training data 110 input to the SVM-RFE 111 may comprise a plurality of training samples $[x_1, x_2, \ldots, x_m]$ corresponding to a group of features, wherein m represents the number of training samples. The training data may further comprise class labels associated with each of the training samples $[y_1, y_2, \ldots, y_m]$. In an embodiment, each of the training samples represents a vector of n dimensions, wherein each dimension corresponds with each feature, and each of the class labels has a number of values. For example, if the training data is gene data collected from a plurality of persons, each of the training samples represents a pattern of n gene expression coefficients for one person, and each of the class labels has two values (i.e., $[1, -1]$) to represent two-class classification of its associated training sample, e.g., whether the person has a certain decease ($y_i=1$) or not ($y_i=-1$).

In an embodiment, the decision logic 21 may determine whether the group is empty and output a feature ranking list or feature elimination history if so. However, if the group is not empty, the SVM learning machine 22 may train the training data by setting a normal to a hyperplane where the training data may be mapped to leave the largest possible margin on either side of the normal. The SVM learning machine 22 may comprise a linear SVM learning machine and non-linear SVM learning machine. In an embodiment for linear SVM learning machine, a normal may comprise a vector ($\vec{\omega}$) representing a linear combination of the training data. For non-linear SVM learning machine, a normal may comprise a vector ($\vec{\omega}$) representing a non-linear combination of the training data. Each component of the vector represents a weight for each feature in the group of features.

In an embodiment, the ranking criterion logic 23 may compute a predetermined ranking criterion for each feature based upon the weight vector $\vec{\omega}$. The eliminating logic 27 may eliminate at least one feature with a certain ranking criterion from the group of features, for example, the at least one feature with a minimum or maximum ranking criterion in the group of features. Then, the decision logic 21 may determine whether the group becomes empty. If not, then in another round of SVM training and feature eliminating, the SVM learning machine 22 will retrain the training data corresponding to the group of features without the eliminated ones, the ranking criterion logic 23 and eliminating logic 24 may compute the predetermined ranking criterion for each features in the group and eliminate at least one features with a minimum ranking criterion from the group of features. The SVM-RFE 111 may repeat the rounds of SVM training and feature eliminating as described above until the group becomes empty.

In an embodiment, the SVM learning machine 22 may comprise a kernel data logic 220, a buffer 221, a Lagrange multiplier logic 222 and a weight logic 223. In a first round of SVM training, the kernel data logic 22 may compute the kernel data based on the training data corresponding to the group of features and store the kernel data in the buffer 22 and then in each round of SVM training later, the kernel data logic 220 may retrieve a kernel data from the buffer 23, update the kernel data based on a part of the training data corresponding to the at least one feature that may be eliminated in a previous round and store the updated kernel data in the buffer in place of the old one.

In an embodiment, the Lagrange multiplier logic 222 may compute a Lagrange multiplier $\alpha_i$ for each of the training samples by utilizing the kernel data output from the kernel data logic 220 and the weight logic 224 may obtain a weight $\omega_k$ for each feature in the group of features, wherein i is an integer in a range of [1, the number of training samples], and k is an integer in a range of [1, the number of features].

Figure 3:
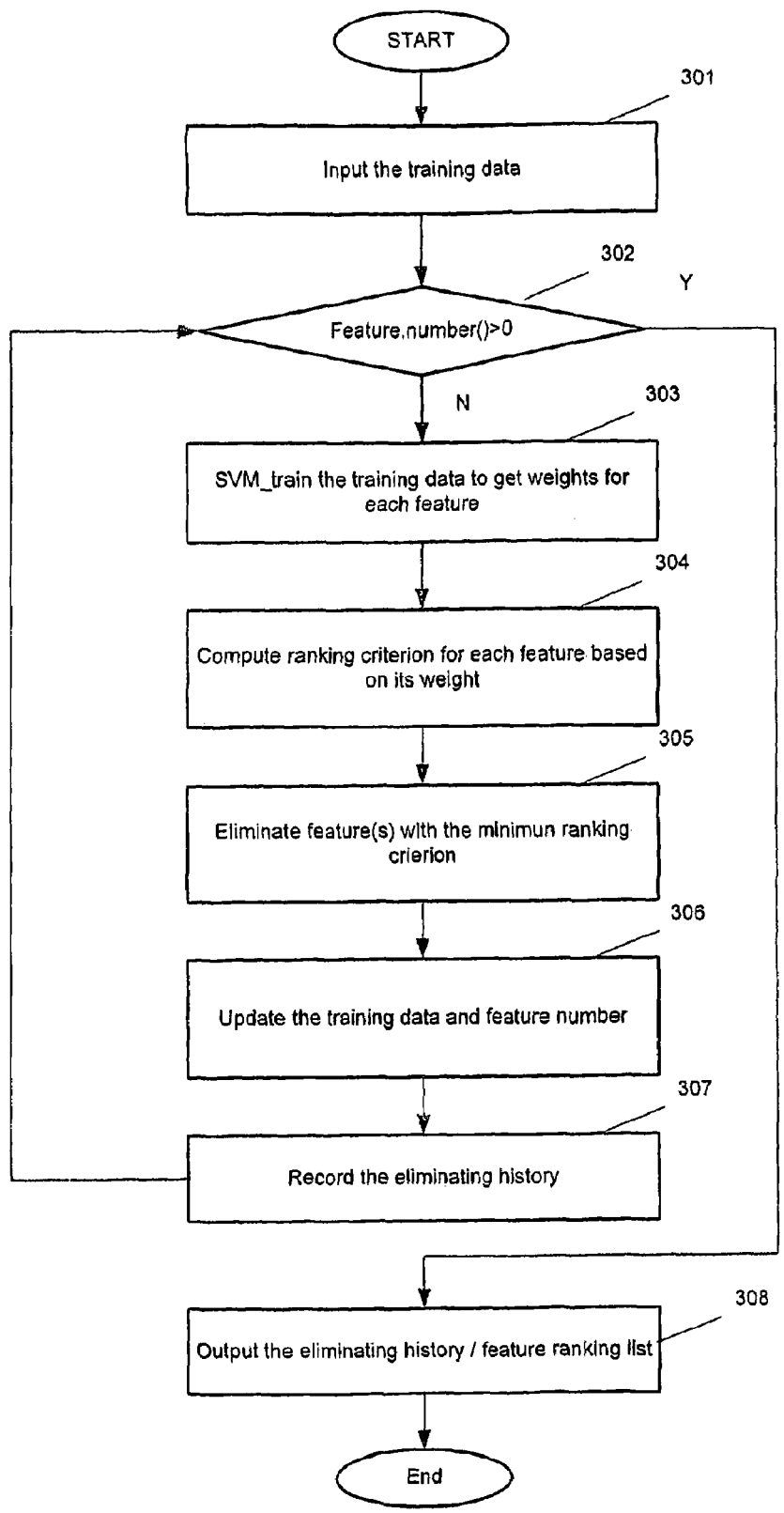
FIG. 3 illustrates an embodiment of a SVM-RFE method.

FIG. 3 depicts an embodiment of a SVM-RFE method that may be implemented by the SVM-RFE 111.

As depicted, the SVM-RFE 111 may input the training data 110 in block 301. In an embodiment, the training data may comprise a plurality of training samples $[x_1, x_2, \ldots, x_m]$, wherein m represents the number of training samples. The training data may further comprise class labels associated with each of the training samples $[y_1, y_2, \ldots, y_m]$. Each of the training samples may represent a vector of n dimensions, wherein each dimension corresponds to each feature in a group of features (hereinafter, the group is labeled as group G), and each of class labels has a number of values to represent the class that its associated training sample belongs to.

In block 302, the decision logic 21 of SVM-RFE 111 may determine whether the number of features in the group G is zero (block 301). If the number of features in the group G is greater than zero, then the SVM learning machine 22 of SVM-RFE 111 may train the training data corresponding to the features in the group G, so as to obtain a vector ($\vec{\omega}$) for the training data (block 303). Each component of the weight vector represents a weight (e.g., weight ($\omega_k$)) for a feature (e.g., the $k^{th}$ feature) in the group G.

Then, the ranking criterion logic 23 may compute a ranking criterion for each feature in the group G based on its weight in block 304. In an embodiment, the ranking criterion is a square of the weight, e.g., $c_k=(\omega_k)^2$, wherein $c_k$ represents the ranking criterion for the $k^{th}$ feature. However, in other embodiments, the ranking criterion may be obtained in other ways.

In block 305, the eliminating logic 24 may eliminate at least one feature with a certain ranking criterion from the group G. In an embodiment, the at least one feature (e.g., the $k^{th}$ feature) may correspond to the ranking criterion (e.g., $c_k=(\omega_k)^2$) that is the minimum in the group G. In another embodiment, the at least one feature may correspond to the ranking criterion that is the maximum in the group G. In other embodiments, the at least one feature may be eliminated in other ways.

In block 306, the eliminating logic 24 of the SVM-RFE 111 or other suitable logics may optionally update the training data by removing a part of the training data that corresponds to the eliminated features. In an embodiment that the input training data may comprise m training samples and m class labels associated with the training samples, and each of the training samples is a vector of n dimensions wherein each dimension corresponds to each feature of the group G, the updated training data may comprise m training samples and m class labels associated with the training samples, and each of the training samples is a vector of (n–p) dimensions wherein (n–p) represents the number of the features in the group G after p features may be eliminated in block 305.

In block 307, the eliminating logic 24 of the SVM-RFE 111 or other suitable logics may record the eliminating history, or record the feature ranking list based on the eliminating history. In an embodiment, the at least one features eliminated in block 305 may be listed as a least important feature in the feature ranking list. In another embodiment, the at least features may be listed as a most important feature in the feature ranking list.

Then, the decision logic 21 of the SVM-RFE 111 may continue to determine whether the number of features in the group G is zero in block 302. If not, the round of SVM training and feature eliminating as described with reference to blocks 303-307 may be repeated until the group G is determined to be empty, namely, the number of features therein is zero.

If the decision logic 21 determines the number of features in the group G is zero in block 302, then the decision logic 21 or other suitable logics of SVM-RFE 111 may output the eliminating history or the feature ranking list.

Figure 4:
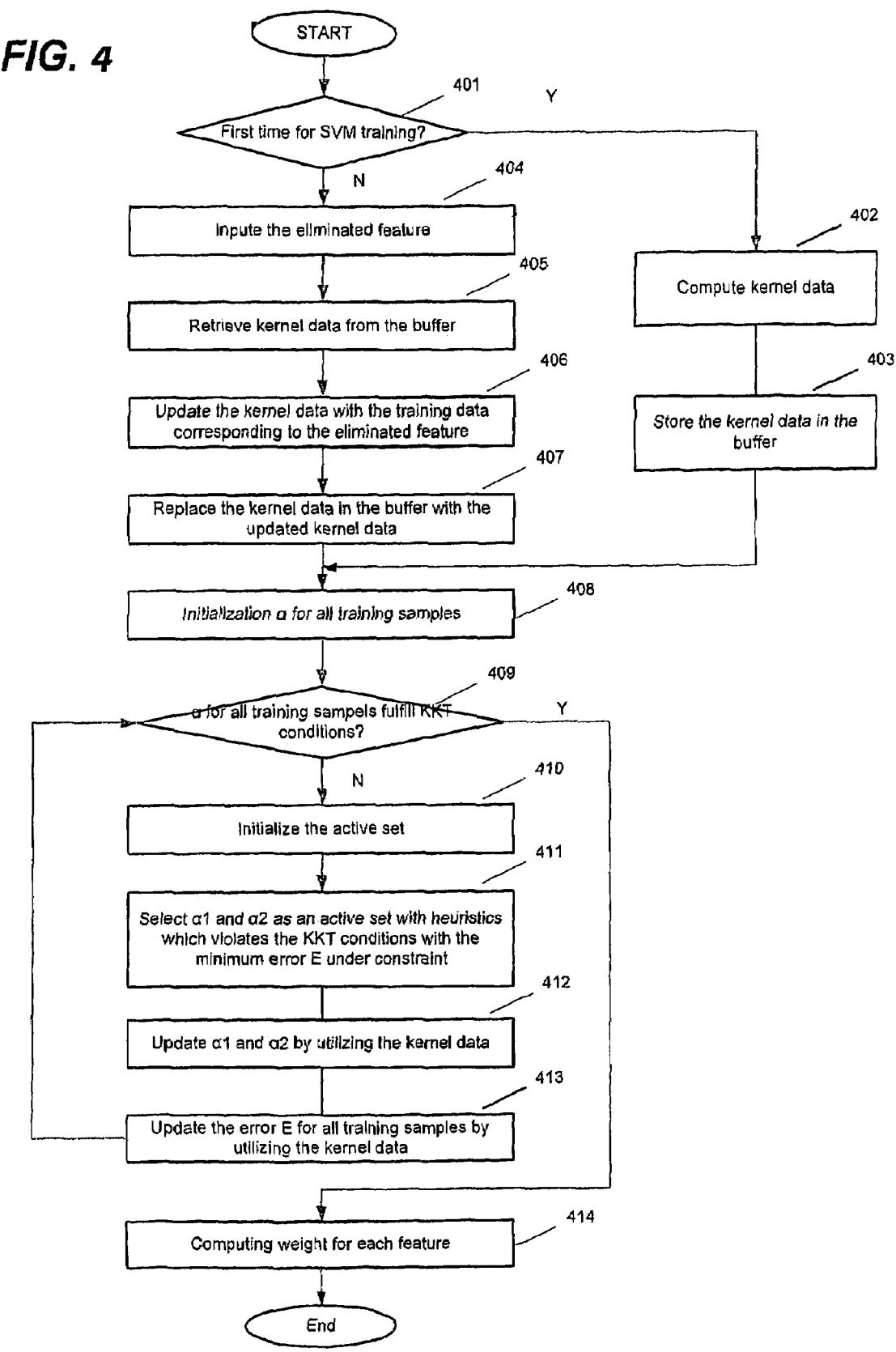
FIG. 4 illustrates an embodiment of a SVM training method involved in the SVM-RFE method of FIG. 3.

FIG. 4 depicts an embodiment of SVM training implemented by the SVM learning machine 22 in block 303 of FIG. 3. In the embodiment, blocks depicted in FIG. 4 may be implemented in each round of SVM training and feature elimination.

As depicted, the kernel data logic 220 of the SVM learning machine or other suitable logics may determine whether it is the first round of SVM training for the training data 110 (block 401). This determination may be accomplished by setting a count number. If it is the first round of SVM training, then the kernel data logic 220 may compute a kernel data based on the training data 110 in block 402. In an embodiment for linear SVM training, the kernel data may be computed by the following equations (1) and (2):

$$K^{round1} = \begin{bmatrix} k_{1,1}^{round1} & \cdots & k_{1,m}^{round1} \\ \cdots & k_{k_{i,j}}^{round1} & \cdots \\ k_{m,1}^{round1} & \cdots & k_{m,m}^{round1} \end{bmatrix} \quad (1)$$

$$k_{ij}^{round1} = x_i^T x_j = \sum_{k=1}^{n} x_{ik} x_{jk} \quad (2)$$

wherein, $K^{round1}$ is the kernel data of a matrix with (m·m) components $k_{ij}^{round1}$, m represents the number of training samples, $x_i^T$ represents a transpose of $i^{th}$ training sample that is a vector of n components, $x_j$ represents $j^{th}$ training sample that is another vector of n components, n represents the number of features in the group G. Other embodiments may implement other modifications and variations to block 406. For example, for non-linear SVM training, the kernel data may be obtained in a different way, e.g., the Gaussian RBF kernel:

$$k_{i,j}^{round1} = e^{\frac{-\|x_i - x_j\|^2}{2\sigma^2}}. \quad (3)$$

Then, the kernel data logic 220 stores the kernel data in the buffer 221 of the SVM learning machine 22 in block 403. The Lagrange multiplier logic 222 may compute a Lagrange multiplier matrix based upon the kernel data in blocks 408-412 and the weight logic 223 may compute a weight vector based on the Lagrange multiplier matrix in block 414. With these implementations, the first round of SVM training for the training data 110 is completed.

However, if the kernel data logic 220 or other suitable logics determines that it is not the first round of SVM training for the training data 110 in block 401, then in block 404, the kernel data logic 220 or other suitable logics may input the at least one feature eliminated in a previous round of feature elimination implemented in block 305 of FIG. 3. For example, if it is $q^{th}$ round of SVM training (q>1), then the kernel data logic or other suitable logics may input the at least one feature eliminated in a $(q-1)^{th}$ round of feature elimination (e.g., the $p^{th}$ feature that is eliminated from the group of n features in the $(q-1)^{th}$ round of feature elimination). Then, the kernel data logic 220 may retrieve the kernel data stored in the buffer 221 in a previous round of SVM training (block 405), and update the kernel data based on a part of the training data corresponding to the at least one eliminated feature (block 406). In an embodiment for linear SVM training, the kernel data may be updated by the following equations (4) and (5):

$$K^{round(q)} = \begin{bmatrix} k_{1,1}^{round(q)} & \cdots & k_{1,m}^{round(q)} \\ \cdots & k_{i,j}^{round(q)} & \cdots \\ k_{m,1}^{round(q)} & \cdots & k_{m,m}^{round(q)} \end{bmatrix} \quad (4)$$

$$k_{ij}^{round(q)} = k_{ij}^{round(q-1)} - x_{ip}x_{jp} \quad (5)$$

wherein, $k_{ij}^{round(q)}$ represents a component of the kernel data K in $q^{th}$ round of SVM training, $k_{ij}^{round(q-1)}$ represents a component of the kernel data K in a $(q-1)^{th}$ round of SVM training, $x_{ip}$ represents the $i^{th}$ training sample with $p^{th}$ feature that is eliminated in $(q-1)^{th}$ round of feature elimination, $x_{jp}$ represents the $j^{th}$ training sample with $p^{th}$ feature that is eliminated in $(q-1)^{th}$ round of feature elimination.

Other embodiments may implement other modifications and variations to block 406. For example, for non-linear SVM training, the kernel data may be updated in a different way, e.g., for the Gaussian RBF kernel, a component for the kernel data K in $q^{th}$ round may be updated by $$k_{ij}^{round(q)} = k_{ij}^{round(q-1)} \times e^{\frac{-(x_{ip}-x_{jp})^2}{2\sigma^2}}. \quad (6)$$

Then, in block 407, the kernel data logic 220 may replace the kernel data in the buffer 221 with the updated kernel data obtained in block 406. The Lagrange multiplier logic 222 may compute a Lagrange multiplier matrix based on the kernel data in blocks 408-412 and the weight logic 223 may compute a weight vector based on the Lagrange multiplier matrix in block 414. With these implementations, the $q^{th}$ round of SVM training is completed.

More specifically, in block 408, the Lagrange multiplier logic 222 may initialize a Lagrange multiplier matrix α in each round of SVM training, wherein each component of the α matrix represents a Lagrange multiplier (e.g. $\alpha_i$) corresponding to a training sample $x_i$. In an embodiment, the initialization of the Lagrange multiplier matrix may be implemented by setting a predetermined value (e.g., zero) to each component of the Lagrange multiplier matrix.

Then, in block 409, the Lagrange multiplier logic 222 may determine whether each of the Lagrange multipliers corresponding to each of the training samples (e.g., $[\alpha_1, \alpha_2, \ldots, \alpha_m]$) fulfill the Karush-Kuhn-Tucker (KKT) conditions. More specifically, whether each of the Lagrange multipliers fulfills the following five conditions:

1. $\frac{\partial}{\partial w_v} L(w, b, \alpha) = w_v - \sum_{i=1}^{m} \alpha_i y_i x_{iv} \quad v = 1, \ldots, n$ 2. $\frac{\partial}{\partial b} L(w, b, \alpha) = -\sum_i \alpha_i y_i = 0$ 3. $y_i(x_i \cdot w - b) - 1 \geq 0 \quad i = 1, \ldots, m$ 4. $\alpha_i \geq 0 \quad \forall i$ 5. $\alpha_i(y_i(x_i \cdot w - b) - 1) = 0$ wherein, $w_v$ represents the weight for the $v^{th}$ feature, b represents a bias value, $L(w, b, \alpha)$ represents a Lagrangian with w,b and α as variables:

$$L(w, b, \alpha) = \frac{1}{2} \langle w \cdot w \rangle - \sum_{i=1}^{m} \alpha_i [y_i(\langle w \cdot x_i \rangle + b) - 1] \quad (7)$$

If not all of the Lagrange multipliers fulfill the KKT conditions, the Lagrange multiplier logic 222 may initialize an active set for two Lagrange multipliers in block 410. In an embodiment, the initialization of the active set may be implemented by clearing a data fragment in a memory of the computing system to store the active set. In other embodiments, the active set may be initialized in other ways.

Then, in block 411, the Lagrange multiplier logic 222 may select two Lagrange multipliers (e.g., $\alpha_1$ and $\alpha_2$) as an active set with heuristics, wherein the two Lagrange multiplier violates the KKT conditions with minimum errors (e.g., errors $E_1$ and $E_2$ respectively associated with the two Lagrange multipliers $\alpha_1$ and $\alpha_2$) under a predetermined constraint. In order to do that, the Lagrange multiplier logic 222 may obtain the errors associated with each of the Lagrange multipliers (e.g., $[\alpha_1, \alpha_2, \ldots, \alpha_m]$) by utilizing the kernel data stored in the buffer 221. In an embodiment for linear SVM training, the predetermined constraint may comprise $0 \leq \alpha_i \leq C$ wherein C is a predetermined value, and the error associated with each Lagrange multiplier may be obtained by the following equation and then stored in an error cache:

$$E_j = \left( \sum_{i=1}^{m} \alpha_i y_i k_{ij}^{round(q)} - y_j \right) \quad j = 1, \ldots, m \quad (8)$$

wherein, $E_j$ represents an error associated with a Lagrange multiplier $\alpha_j$ in $q^{th}$ round of SVM training, $k_{ij}^{round(q)}$ my be obtained from the kernel data stored in the buffer 221. Other embodiments may implement other modifications and variations to block 411. For example, the active set may comprise the number of Lagrange multipliers other than two.

Then, in block 412, the Lagrange multiplier logic 222 may update the Lagrange multipliers in the active set by utilizing the kernel data K stored in the buffer 221. In an embodiment that the SVM learning machine is a linear learning machine and the active set may comprise two Lagrange multipliers (e.g., $\alpha_1$ and $\alpha_2$), the Lagrange multipliers may be updated with the following equations:

$$\alpha_2^{new} = \alpha_2 + \frac{y_2(E_2 - E_1)}{\eta}, \eta \equiv 2k_{12} - k_{11} - k_{22}, \quad (9)$$

$$E_j = \left(\sum_{i=1}^m \alpha_i y_i k_{ij}^{round(q)} - y_j\right) - y_j$$

$$\alpha_2^{new,clipped} = \begin{cases} H & \text{if } \alpha_2^{new} \geq H \\ \alpha_2^{new} & \text{if } L < \alpha_2^{new} < H \\ L & \text{if } \alpha_2^{new} \leq L \end{cases} \quad (10)$$

$$L = \max(0, \alpha_2 - \alpha_1), \quad H = \min(C, C + \alpha_2 - \alpha_1) \quad (11)$$

$$\alpha_1^{new} = \alpha_1 + s(\alpha_2 - \alpha_2^{new,clipped}), s = y_1 y_2 \quad (12)$$

However, other embodiments may implement other modifications and variations to block 412.

Then, in block 413, the Lagrange multiplier logic 222 may update the error cache by computing the errors associated with the updated Lagrange multipliers in the active set with the equation (8).

Then, the Lagrange multiplier logic 222 may continue to update other Lagrange multipliers in the Lagrange multiplier matrix in blocks 408-413, until all of the Lagrange multipliers in the matrix fulfill KKT conditions.

Then, the weight logic 223 may compute the weight vector ($\vec{\omega}$) based on the Lagrange multipliers obtained in blocks 408-413, wherein each component of the vector corresponds to each of the feature. In an embodiment for linear SVM training, weight for each feature may be obtained with the following equation:

$$w_k = \sum_{i=1}^m \alpha_i y_i x_{ik} \quad (13)$$

wherein, $w_k$ represents a weight for $k^{th}$ feature, m represent the number of the training samples, $x_{ik}$ represents the training samples corresponding to the $k^{th}$ feature. However, other embodiments may implement other modifications and variations to block 414.

Although the present invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method, comprising
determining a value for each feature in a group of features provided by a training data;
eliminating at least one feature with one of a minimum value and a maximum value from the group;
retrieving a kernel data from a buffer;
subtracting a matrix from the kernel data to provide an updated kernel data, each component of the matrix comprising a dot product of two of training samples provided by at least a part of the training data that corresponds to the eliminated feature;
updating the value for each feature of the group based on the updated kernel data;
repeating of eliminating the at least one feature from the group and updating the value for each feature of the group until a number of features in the group reaches a predetermined value to generate a feature ranking list;
recognizing a new data corresponding to the group of features with the feature ranking list.

2. The method of claim 1, wherein the training data further comprises a plurality of training samples, each of the training samples corresponding to the group of features.

3. The method of claim 1, wherein determining the value comprises:
computing a kernel data based on the training data;
computing the value for each feature of the group based on the kernel data; and
storing the kernel data in a buffer.

4. The method of claim 3, wherein computing the kernel data further comprises computing a matrix as the kernel data, each component of the matrix comprising a dot product of two of training samples provided by the training data.

5. The method of claim 1, wherein eliminating at least one feature comprises:
computing a ranking criterion for each feature of the group based on the value for the each feature;
eliminating the at least one feature with the minimum ranking criterion from the group; and
recording the eliminated feature in a feature ranking list.

6. A support vector machine, comprising:
a training logic to determine a value for each feature in a group of features provided by a training data; and
an eliminate logic to eliminate at least one feature with one of a minimum value and a maximum value from the group,
wherein the training logic further comprises a buffer to store a kernel data, a kernel data logic to subtract a matrix from the kernel data to provide an updated kernel data, each component of the matrix comprising a dot product of two of training samples provided by at least a part of the training data that corresponds to the eliminated feature and a value update logic to update the value based on the updated kernel data, and
wherein the apparatus further repeats eliminating the at least one feature from the group and updating the value for each feature of the group until a number of features in the group reaches a predetermined value, to generate a feature ranking list for a use of recognizing a new data corresponding to the group of features.

7. The support vector machine of claim 6, wherein the training data comprises a plurality of training samples, each of the training samples having the group of features.

8. The support vector machine of claim 6, further comprising:
a decision logic to decide whether to repeat the elimination of the at least one features from the group and update of the value for each feature of the group until a number of features in the group reaches a predetermined value.

9. The support vector machine of claim 6, wherein the eliminate logic further comprises a ranking criterion logic to compute a ranking criterion for each feature of the group based on the value for the each feature.

10. The support vector machine of claim 6, wherein the eliminate logic further comprises a feature eliminate logic to eliminate the at least one feature having the minimum ranking criterion from the group.

11. A machine-readable medium comprising a plurality of instructions, that in response to being executed, result in a computing system:

determining a value for each feature in a group of features provided by a training data;

eliminating at least one feature with one of a minimum value and a maximum value from the group;

retrieving a kernel data from a buffer;

subtracting a matrix from the kernel data to provide an updated kernel data, each component of the matrix comprising a dot product of two of training samples provided by at least a part of the training data that corresponds to the eliminated feature;

updating the value for each feature of the group based on the updated kernel data;

repeating of eliminating the at least one feature from the group and updating the value for each feature of the group until a number of features in the group reaches a predetermined value to generate a feature ranking list;

recognizing a new data corresponding to the group of features with the feature ranking list.

12. The machine-readable medium of claim 11, wherein the training data further comprises a plurality of training samples, each of the training samples corresponding to the group of features.

13. The machine-readable of claim 11, wherein the plurality of instructions that result in the computing system determining the value, further result in the computing system:

computing a kernel data based on the training data;

computing the value for each feature of the group based on the kernel data; and storing the kernel data in a buffer.

14. The machine-readable of claim 13, wherein the plurality of instructions that result in the computing system computing the kernel data, further result in the computing system computing a matrix as the kernel data, each component of the matrix comprising a dot product of two of training samples provided by the training data.

15. The machine-readable of claim 11, wherein the plurality of instructions that result in the computing system eliminating at least one feature, further result in the computing system:

computing a ranking criterion for each feature of the group based on the value for the each feature;

eliminating the at least feature with the minimum ranking criterion from the group; and recording the eliminated feature in a feature ranking list.

* * * * *

(12) EX PARTE REEXAMINATION CERTIFICATE (9344th)
United States Patent
Li et al.

(10) Number: US 7,685,077 C1
(45) Certificate Issued: Oct. 5, 2012

(54) RECURSIVE FEATURE ELIMINATING METHOD BASED ON A SUPPORT VECTOR MACHINE

(75) Inventors: Eric Q. Li, Beijing (CN); Qian Diao, Beijing (CN)

(73) Assignee: Intel Corporation, Santa Clara, CA (US)

Reexamination Request:
No. 90/011,938, Nov. 10, 2011

Reexamination Certificate for:
Patent No.: 7,685,077
Issued: Mar. 23, 2010
Appl. No.: 10/587,094
Filed: Jul. 20, 2006

(21) Appl. No.: 90/011,938

(22) PCT Filed: Aug. 11, 2005

(86) PCT No.: PCT/CN2005/001242
§ 371 (c)(1),
(2), (4) Date: Jul. 20, 2006

(87) PCT Pub. No.: WO2007/016814
PCT Pub. Date: Feb. 15, 2007

(51) Int. Cl.
*G06F 15/18* (2006.01)
(52) U.S. Cl. .......................................................... 706/12
(58) Field of Classification Search .................. None
See application file for complete search history.

(56) References Cited

To view the complete listing of prior art documents cited during the proceeding for Reexamination Control Number 90/011,938, please refer to the USPTO's public Patent Application Information Retrieval (PAIR) system under the Display References tab.

*Primary Examiner* — Matthew Heneghan

(57) ABSTRACT

Method, apparatus and system are described to perform a feature eliminating method based on a support vector machine. In some embodiments, a value for each feature in a group of features provided by a training data is determined. At least one feature is eliminated from the group by utilizing the value for each feature in the group. The value for each feature in the group is updated based upon a part of the training data that corresponds to the eliminated feature.

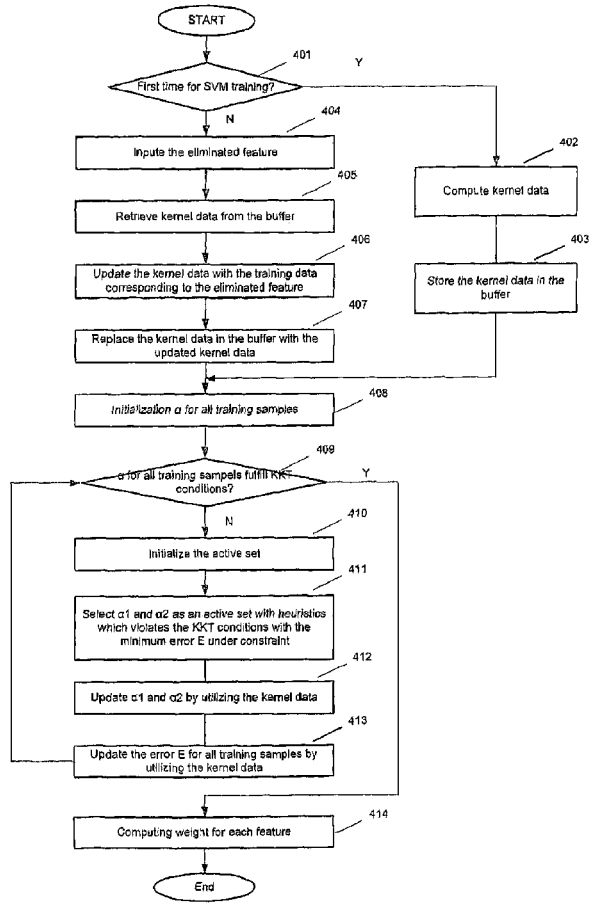

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6 and 11 are determined to be patentable as amended.

Claims 2-5, 7-10 and 12-15, dependent on an amended claim, are determined to be patentable.

1. A method, comprising
   determining a value for each feature in a group of features provided by a training data;
   eliminating at least one feature with one of a minimum [value] *ranking criterion* and a maximum [value] *ranking criterion* from the group, *wherein the one of the minimum ranking criterion and the maximum ranking criterion is obtained based on the value for each feature in the group*;
   retrieving a kernel data from a buffer;
   subtracting a matrix from the kernel data to provide an updated kernel data, each component of the matrix comprising a dot product of two training samples provided by at least a part of the training data that corresponds to the eliminated feature;
   *storing the updated kernel data in the buffer to replace the kernel data;*
   updating the value for each feature of the group based on the updated kernel data;
   repeating of eliminating the at least one feature from the group and updating the value for each feature of the group until a number of features in the group reaches a predetermined value to generate a feature ranking list; *and*
   recognizing a new data corresponding to the group of features with the feature ranking list.

6. A support vector machine, comprising:
   a training logic to determine a value for each feature in a group of features provided by a training data; and
   an eliminate logic to eliminate at least one feature with one of a minimum [value] *ranking criterion* and a maximum [value] *ranking criterion* from the group, *wherein the one of the minimum ranking criterion and the maximum ranking criterion is obtained based on the value for each feature in the group*;
   wherein the training logic further comprises a buffer to store a kernel data, a kernel data logic to subtract a matrix from the kernel data to provide an updated kernel data, each component of the matrix comprising a dot product of two training samples provided by at least a part of the training data that corresponds to the eliminated feature, *and to store the updated kernel data in the buffer to replace the kernel data*, and a value update logic to update the value *for each feature* based on the updated kernel data, and
   wherein the apparatus *support vector machine* further repeats eliminating the at least one feature from the group and updating the value for each feature of the group until a number of features in the group reaches a predetermined value, to generate a feature ranking list for a use of recognizing a new data corresponding to the group of features.

11. A machine-readable medium comprising a plurality of instructions, that in response to being executed, result in a computing system:
    determining a value for each feature in a group of features provided by a training data;
    eliminating at least one feature with one of a minimum [value] *ranking criterion* and a maximum [value] *ranking criterion* from the group, *wherein the one of the minimum ranking criterion and the maximum ranking criterion is obtained based on the value for each feature in the group*;
    retrieving a kernel data from a buffer;
    subtracting a matrix from the kernel data to provide an updated kernel data, each component of the matrix comprising a dot product of two training samples provided by at least a part of the training data that corresponds to the eliminated feature;
    *storing the updated kernel data in the buffer to replace the kernel data;*
    updating the value for each feature of the group based on the updated kernel data;
    repeating of eliminating the at least one feature from the group and updating the value for each feature of the group until a number of features in the group reaches a predetermined value to generate a feature ranking list; *and*
    recognizing a new data corresponding to the group of features with the feature ranking list.

* * * * *